United States Patent [19]
Wenker

[11] Patent Number: 4,493,404
[45] Date of Patent: Jan. 15, 1985

[54] HYDRAULIC GEROTOR MOTOR AND PARKING BRAKE FOR USE THEREIN

[75] Inventor: Wayne B. Wenker, Hopkins, Minn.

[73] Assignee: Eaton Corporation, Cleveland, Ohio

[21] Appl. No.: 443,512

[22] Filed: Nov. 22, 1982

[51] Int. Cl.$^3$ .......................... F16H 57/10; B60K 41/28
[52] U.S. Cl. .......................... 192/4 A; 192/3 N; 74/411.5; 418/61 B
[58] Field of Search .............. 192/3 N, 3 R, 4 R, 4 A, 192/3 S, 4 B; 74/411.5; 418/61 B

[56] References Cited

U.S. PATENT DOCUMENTS

| | | | |
|---|---|---|---|
| 3,616,882 | 11/1971 | White | 192/4 B |
| 3,960,470 | 6/1976 | Kinder | 192/3 N |
| 4,390,329 | 6/1983 | Thorson | 418/61 B |
| 4,451,217 | 5/1984 | White | 418/61 B |
| 4,457,677 | 7/1984 | Todd | 418/61 B |

OTHER PUBLICATIONS

GR-M Publication, Tokyo Instrument, Sep. 12, 1981.
Ausco Publication, Failsafe Brakes, June 1982.

*Primary Examiner*—George H. Krizmanich
*Attorney, Agent, or Firm*—C. H. Grace; L. J. Kasper

[57] ABSTRACT

A hydraulic motor including an integral parking brake section (15). The motor is of the type including a gerotor displacement mechanism (17) including an orbiting and rotating star (27) and a main drive shaft (41) which engages in orbital movement. The parking brake includes a lock shaft (77) having a cutaway portion (125) which permits normal orbital movement of the main drive shaft (41) in the unlocked condition. When it is desired to lock the motor and prevent rotation of the output shaft (31), the lock shaft (77) is rotated by a control shaft (101) to a locked condition in which a lock surface (123) is disposed within the orbit circle (C) of the drive shaft (41) to prevent orbital movement thereof.

14 Claims, 6 Drawing Figures

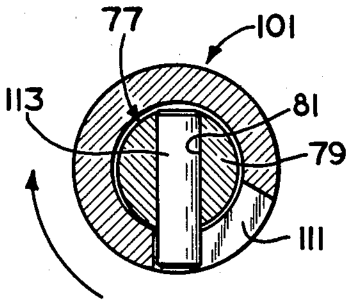
FIG. 3
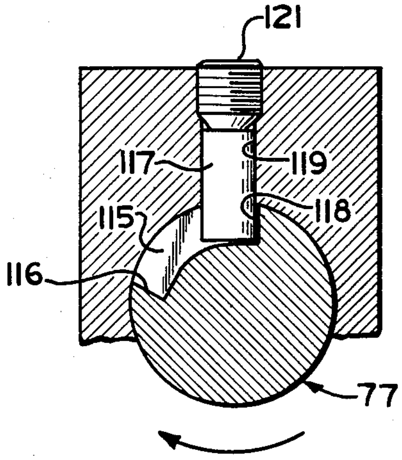
FIG. 4
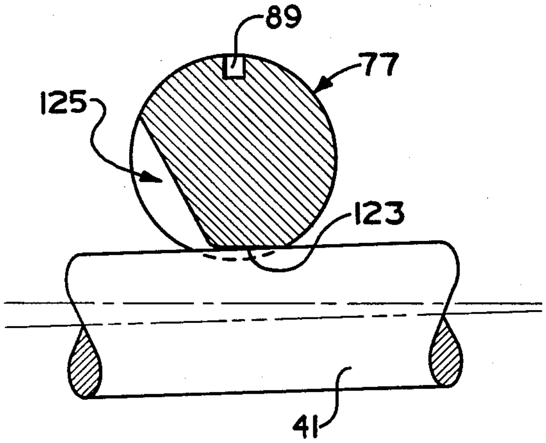
FIG. 6
FIG. 5
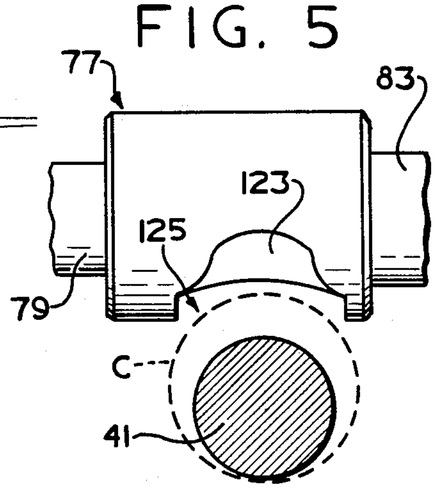

HYDRAULIC GEROTOR MOTOR AND PARKING BRAKE FOR USE THEREIN

BACKGROUND OF THE DISCLOSURE

The present invention relates to hydraulic motors of the gerotor type, and more particularly, to a parking brake for use in such motors.

Although the present invention may be utilized in hydraulic devices functioning as pumps, it is especially advantageous when used with a device operating as a motor, and will be described in connection therewith.

Hydraulic motors utilizing gerotor displacement mechanisms have been popular for many years for low speed high torque applications. Such motors typically include a housing defining a fluid inlet and a fluid outlet and a gerotor gear set associated with the housing. The gerotor gear set normally includes an internally-toothed ring fixed to the housing, and an externally-toothed star eccentrically disposed within the ring for orbital and rotational movement relative to the ring. The teeth of the ring and star interengage to define expanding and contracting volume chambers during the relative movement. A valve means within the housing operates in response to the relative movement to communicate fluid from the fluid inlet to the expanding fluid chambers, and from the contracting fluid chambers to the fluid outlet. An output shaft extends from the housing and is rotatably supported thereby, and a shaft member has a first end connected to the star and a second end connected to the output shaft, to transmit the orbital and rotational movements of the star into a low speed high torque rotational movement of the output shaft.

As is well known to those skilled in the art, various arrangements of gerotor motors are known other than that described above wherein the ring is fixed to the housing and the star orbits and rotates, and although the invention may be applied advantageously to such other gerotor motor arrangements, as will be described subsequently, the above-described arrangement is the most common and constitutes the preferred embodiment of the invention.

Low speed high torque gerotor motors are frequently used to propel the drive wheels of vehicles, thus making it desirable for the motor to include some form of parking brake. Another major use of such motors is to drive vehicles accessories, such as hoists and winches, and in this type of application it is desirable for the motor to have a "load holding" capability.

One attempt by those working in the prior art to provide a motor equipped with a parking brake is shown in U.S. Pat. No. 3,616,882 in which a thin, flexible friction member can be selectively pressure biased into engagement with an end face of the gerotor star. However, it appears that such an arrangement would result in excessive friction and generated heat, with the possibility of galling the end surface of the star. In addition, the parking brake shown in the cited reference is not positive acting, but instead, depends upon the presence of hydraulic pressure.

Another approach to the need for a positive acting brake has been the use of a disc pack, with some of the discs being splined to the fixed housing, and alternating discs being splined to the rotating output shaft. Typically, the discs are spring biased into engagement (braking) and hydraulic pressure is required to disengage the discs. In one commercial embodiment, the disc pack is disposed within the housing of the gerotor motor and is operable to lock the motor output shaft to the motor housing. This approach requires almost total redesign of the motor housing and output shaft, thus making it economically impractical to offer a parking brake as a motor option. In another commercial design, a separate parking brake package engages the motor output shaft and has its own housing and separate output shaft which can be locked together by engagement of a disc pack. This separate parking brake has the advantage that it can be added as an option, because no major modification of the motor is required, but the cost of the commercially available parking brake may be as much or more than the gerotor motor itself.

SUMMARY OF THE INVENTION

Accordingly, it is an object of the present invention to provide a rotary fluid pressure device having an integral parking brake (lock) which does not involve any change in, or addition to the hydraulic circuit of the motor.

It is another object of the present invention to provide such a parking brake which is failsafe in operation, i.e., provides a positive mechanical lock to prevent rotation of the motor output shaft.

It is another object of the present invention to provide such a parking brake which is integral with the motor, but which may be added to the motor as an option at reasonable expense, without requiring substantial redesign of the motor.

The above and other objects of the present invention are accomplished by the provision of an improved rotary fluid pressure device of the type described. The device is characterized by a lock member which is operably associated with the motor housing and is disposed adjacent a transverse portion of the shaft member. This transverse portion of the shaft member is disposed intermediate the first and second ends and defines an imaginary orbit circle as the externally-toothed star orbits and rotates. The lock member defines a surface and is movable between a first position in which the lock surface is disposed outside the orbit circle to permit normal orbital and rotational movement of the shaft member, and a second position in which the lock surface is disposed within the orbit circle to engage the shaft member and prevent orbital movement thereof, thereby preventing rotation thereof.

BRIEF DESCRIPTION OF THE DRAWINGS

FIGS. 3 and 4 are cross section views taken on lines 3—3 and 4—4, respectively, of FIG. 2, and on the same scale as FIG. 2.

FIG. 5 is a fragmentary view, similar to FIG. 2, showing the parking brake of the present invention in the unlocked position.

FIG. 6 is a cross section taken on line 6—6 of FIG. 2, showing the parking brake of the present invention in the locked condition.

DESCRIPTION OF THE PREFERRED EMBODIMENT

Figure 1:
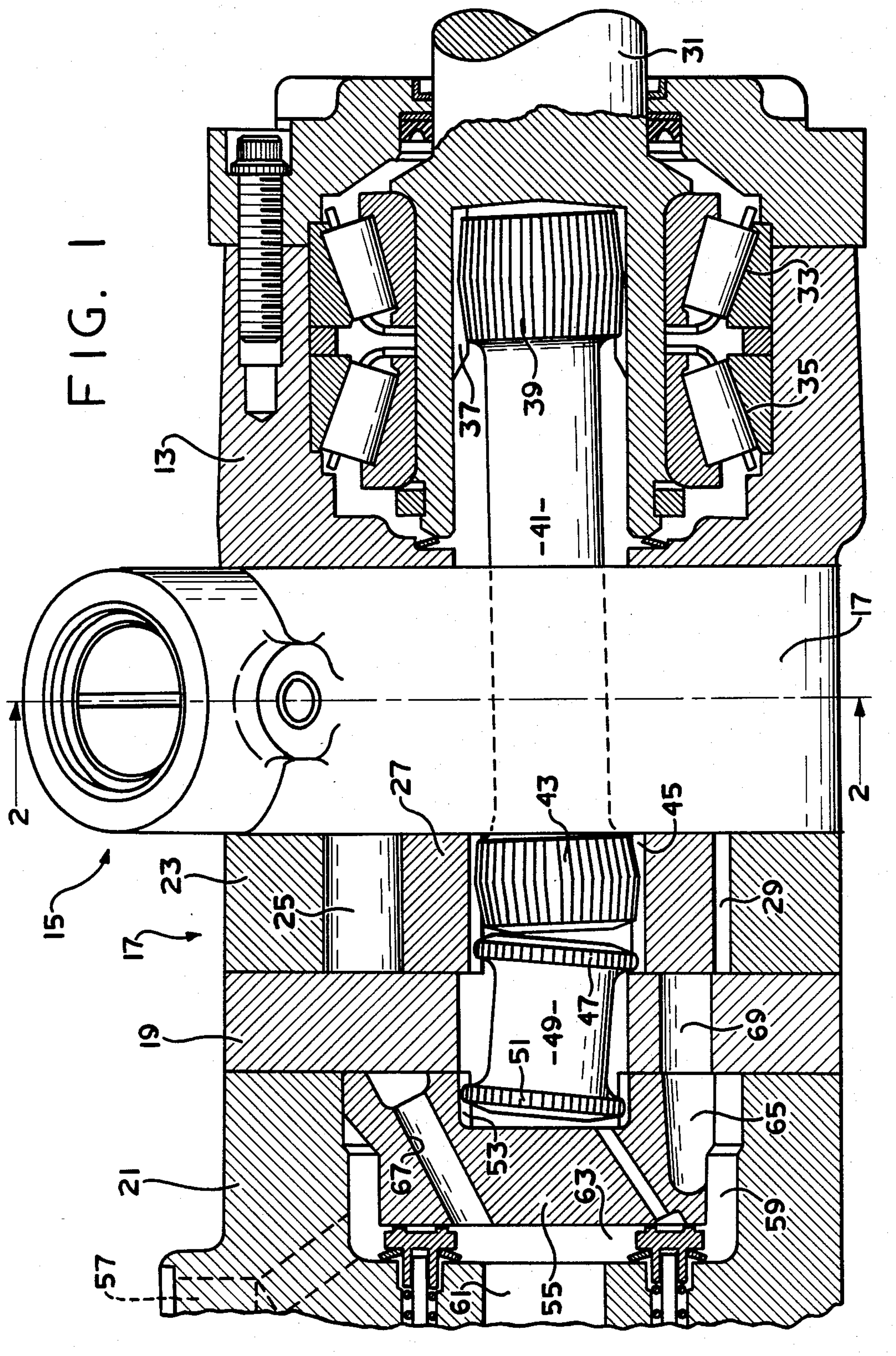
FIG. 1 is a fragmentary view, partly in axial cross section, and partly in side elevation, showing a low speed high torque gerotor motor of the type to which the present invention may be applied.

Referring now to the drawings, which are not intended to limit the invention, FIG. 1 illustrates a low speed high torque gerotor motor of the type to which the present invention may be applied and which is illustrated and described in greater detail in U.S. Pat. Nos. 3,572,983 and 4,343,600, both of which are assigned to the assignee of the present invention, and are incorporated herein by reference.

Figure 2:
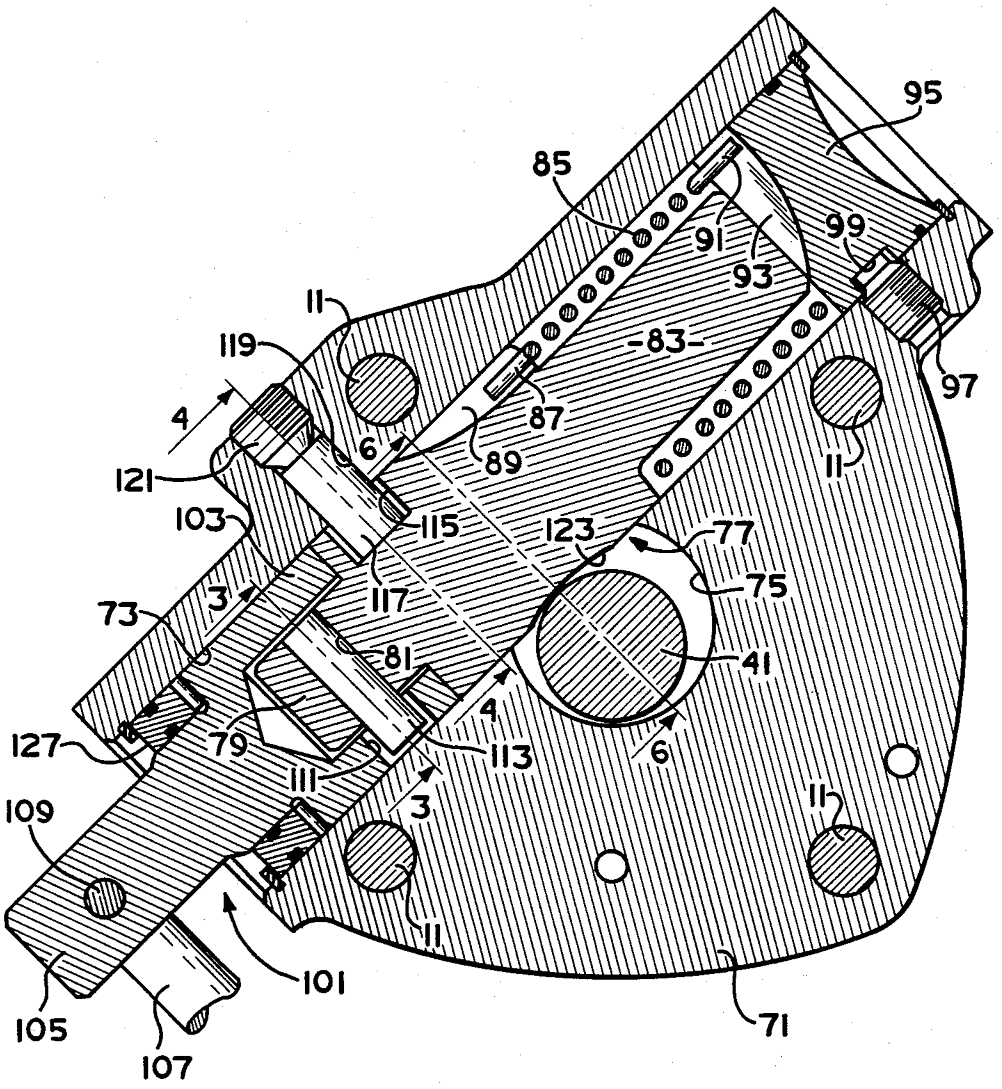
FIG. 2 is a transverse cross section taken on line 2—2 of FIG. 1, and on the same scale as FIG. 1, illustrating the parking brake of the present invention.

The hydraulic motor shown in FIG. 1 comprises a plurality of sections secured together, such as by a plurality of bolts 11 (shown in only in FIG. 2). The motor includes a shaft support casing 13, a parking brake section 15, a gerotor displacement mechanism 17, a port plate 19, and a valve housing portion 21.

The gerotor displacement mechanism 17 is well known in the art, is shown and described in great detail in the incorporated patents, and will be described only briefly herein. More specifically, the displacement mechanism 17 is a Geroler ® mechanism comprising an internally-toothed ring 23 defining a plurality of generally semi-cylindrical openings, with a cylindrical member 25 (internal tooth) disposed in each of the openings. Eccentrically disposed within the ring 23 is an externally-toothed star 27, typically having one less external tooth than the number of cylindrical members 25, thus permitting the star 27 to orbit and rotate relative to the ring 23. The relative orbital and rotational movement between the ring 23 and star 27 defines a plurality of expanding and contracting volume chambers 29.

Referring still to FIG. 1, the motor includes an output shaft 31 positioned within the shaft support casing 13 and rotatably supported therein by suitable bearing sets 33 and 35. The shaft 31 includes a set of internal, straight splines 37, and engagement therewith is a set of external, crowned splines 39 formed on one end of a main drive shaft 41. Disposed at the opposite end of the main drive shaft 41 is another set of external, crowned splines 43, in engagement with a set of internal, straight splines 45, formed on the inside diameter of the star 27. Therefore, in the subject embodiment, because the ring 23 includes seven internal teeth 25, and the star 27 includes six external teeth, six orbits of the star 27 result in one complete rotation thereof, and one complete rotation of the main drive shaft 41 and the output shaft 31.

As is well known to those skilled in the art, the drive shaft 41 always has its axis disposed at an angle relative to the main axis of the motor, i.e., the axis of the ring 23 and of the output shaft 31. The primary function of the drive shaft 41 is to transmit torque from the gerotor star 27 to the output shaft 31. This is accomplished by translating the orbital and rotational movement of the star 27 into pure rotational motion of the output shaft 31. Thus, the portion of the main drive shaft which extends through the parking brake section 15 engages in both orbital and rotational movement.

Also in engagement with the internal splines 45 is a set of external splines 47 formed about one end of a valve drive shaft 49 which has, at its opposite end, another set of external splines 51 in engagement with a set of internal splines 53 formed about the inner periphery of a valve member 55. The valve member 55 is rotatably disposed within the valve housing 21, which is shown fragmentarily in FIG. 1 for ease of illustration. The valve drive shaft 49 is splined to both the star 27 and the valve member 55 in order to maintain proper valve timing therebetween, as is generally well known in the art.

The valve housing 21 includes a fluid port 57 in communication with an annular chamber 59 which surrounds the valve member 55. The valve housing 21 also includes an outlet port 61 which is in fluid communication with a chamber 63 disposed between the valve housing 21 and valve member 55. The valve member 55 defines a plurality of alternating valve passages 65 and 67, the passages 65 being in continuous fluid communication with the annular chamber 59, and the passages 67 being in continuous fluid communication with the chamber 63. In the subject embodiment, there are six of the passages 65, and six of the passages 67, corresponding to the six external teeth of the star 27. The port plate 19 defines a plurality of fluid passages 69 (only one of which is shown in FIG. 1), each of which is disposed to be in continuous fluid communication with the adjacent volume chamber 29. Motors of the type shown in FIG. 1 (but without the parking brake section 15) are commercially available, and are well known to those skilled in the art., and for any further details regarding the construction or operation of such a motor, reference should be made to the above-incorporated patents.

PARKING BRAKE

Referring now to FIG. 2, the parking brake section 15 will now be described. The parking section 15 includes a plate-like housing 71 defining an angled bore 73. The bore 73 intersects a central opening 75 through which the main drive shaft 41 extends. Disposed within the angled bore 73 is a rotatable lock shaft, generally designated 77, which includes a reduced diameter portion 79 defining a diametral bore 81, and a reduced diameter portion 83.

Disposed about the portion 83 is a torsional spring 85, having a rotatable end 87 received in a milled slot 89 defined by the lock shaft 77. The spring 85 includes a fixed end 91 which is received in a milled slot 93, which is formed in an end cap 95. A set screw 97 is threaded into the housing 71 and extends into a circular recess 99 defined by the end cap 95. This arrangement prevents rotation of the end cap 95 within the housing 71, which would permit the torsional spring 85 to unwind.

Also disposed partially within the angled bore 73 is a rotatable control shaft 101, which includes an enlarged portion 103 and a reduced diameter portion 105. The enlarged portion 103 receives and surrounds the reduced diameter portion 79 of the lock shaft 77. An actuator handle 107 is attached to the reduced diameter portion 105 by means of a suitable fastener 109, such that movement of the handle 107 will result in rotation of the control shaft 101 within the bore 73.

The enlarged portion 103 of the control shaft 101 includes a circumferential slot 111, and a cross pin 113 is received within the diametral bore 81 of the lock shaft 77 and extends into the slot 111 (see also FIG. 3). The lock shaft 77 also defines a circumferential slot 115 having end surfaces 116 and 118, and a limiter pin 117 is disposed within a bore 119 defined by the housing 71 and extends into the slot 115. A set screw 121 is threaded into the bore 119 to maintain the limiter pin 117 in the bore 119 as shown in FIG. 2 (see also FIG. 4). A seal retainer 127 is disposed between the reduced diameter portion 105 and the bore 73 to prevent leakage of case drain fluid from the opening 75 and bore 73. All fluid seals are carried by the fixed end cap 95 and seal retainer 127, rather than movable members, to eliminate any drag caused by case drain pressure.

Referring now primarily to FIGS. 2, 5, and 6, the lock shaft 77 defines a lock surface 123 and a cutaway portion 125, shown only in FIGS. 5 and 6. As may best be seen in FIG. 6, the lock surface 123 and the cutaway portion 125 are relatively displaced from each other by about 60 degrees of rotation of the lock shaft 77.

Referring now primarily to FIG. 5, it should be noted that, as the portion of the shaft 41 adjacent the lock shaft 77 orbits and rotates, this porton of the shaft 41 defines an imaginary orbit circle C. The orbit circle C is concentric with the axis of the ring 23 and output shaft 31 and, as may be seen by comparing FIGS. 2 and 5, is nearly as large in diameter as the central opening 75. With the lock shaft 77 rotated to the position shown in FIG. 5, in which the cutaway portion 125 is facing the shaft 41, it should be apparent that the lock shaft 77 does not extend into the orbit circle C, and therefore, does not interfere with or prevent the normal orbital and rotational movement of the shaft 41. Thus, FIG. 5 illustrates the unlocked condition of the lock shaft 77.

OPERATION

If the flow of pressurized fluid to the inlet port 57 is stopped, and it is now desirable to prevent the load on the output shaft 31 from turning the shaft 31 and star 27, the parking brake section 15 may be utilized to prevent further orbital movement of the main drive shaft 41 which, in turn, prevents further rotation of output shaft 31.

With the parking brake (lock shaft 77) in the unlocked condition of FIG. 5 the control shaft 101 and lock shaft 77 will be in the positions shown in FIGS. 3 and 4. In the unlocked condition of the parking brake, the torsional spring 85 exerts a force of about 30 inch pounds (3.39 Newton-meters) tending to rotate the lock shaft 77 in the clockwise direction as viewed in FIGS. 3 and 4. However, the lock shaft 77 is prevented from rotating clockwise away from the unlocked condition by the enagagement of the cross pin 113 with the end of the circumferential slot 111.

To put the parking brake (lock shaft 77) in the locked condition, the handle 107 is moved to rotate the control shaft 101 approximately 60 degrees clockwise (see arrow in FIG. 3). The slot 111 and cross pin 113 provide a form of "lost motion" connection between the lock shaft 77 and control shaft 101. This is a preferred arrangement because, at the instant the control shaft 101 is rotated, the drive shaft 41 may be at a position in its orbital movement which would interfere with rotation of the lock shaft 77 to the locked position of FIG. 6.

As the control shaft 101 is rotated, as described previously, the slot 111 also moves in a clockwise direction, thus permitting the cross pin 113 and control shaft 77 to rotate in a clockwise direction, under the influence of the torsional spring 85. However, if the main drive shaft 41 is in a position which would interfere with rotation of the lock shaft 77, as described previously, the lock shaft 77 will be prevented from rotating clockwise until the drive shaft 41 has continued its orbital movement a sufficient amount (approximately one-half of an orbit) to be in the position shown in FIGS. 2 and 5, not interfering with the continued rotation of the lock shaft 77. The spring 85 then rotates the lock shaft 77 the rest of the way in the clockwise direction to the locked condition of FIG. 6 in which the lock surface 123 engages the drive shaft 41.

Referring to FIG. 4, it should be noted that the lock shaft 77 is permitted to rotate to the locked condition of FIG. 6, and no further, by the engagement of the end surface 116 of the slot 115 with the limiter pin 117. It should be noted in FIG. 2 that the lock surface 123 is preferably somewhat curved to increase the area of contact between the surface 123 and the drive shaft 41, thus reducing the surface stress which occurs during engagement with a load attempting to rotate the output shaft 31 and drive shaft 41. With the parking brake in the locked condition, it is preferred that the torsion spring 85 should still be exerting a force tending to rotate the lock shaft 77 in the clockwise direction, even though the lock shaft 77 is prevented from further rotation by the limiter pin 117 as described previously. In the subject embodiment, with the parking brake locked, the spring 85 still exerts a torque of about 20 inch pounds (2.26 Newton-meters).

When it is again desired to direct pressurized fluid to the motor, to drive the motor in one direction or the other, it is necessary to return the parking brake to the unlocked condition, before a substantial amount of pressurized fluid flows to the motor. A return to the unlocked condition is accomplished by moving the handle 107 in the direction opposite its earlier movement, thus rotating the control shaft 101 in the counterclockwise direction. This results in rotation of the lock shaft 77 in the counterclockwise direction, by means of the cross pin 113, and against the biasing force in the spring 85, until the shafts 77 and 101 and cross pin 113 are again in the position shown in FIG. 3. At the same time, the lock shaft 77 is again in the position shown in FIGS. 4 and 5, with further rotation of the lock shaft 77, beyond the unlocked condition, being prevented by engagement of the end surface 118 of the slot 115 with the limiter pin 117.

It may thus be seen that the present invention provides a positive acting parking brake or lock which is operable to prevent rotation of the motor output shaft 31 whenever so desired by the operator. It is also an important feature of the present invention that this lock capability can be added to a motor of the type shown in FIG. 1, as an option, merely by inserting the parking brake section 15 between the shaft support casing 13 and gerotor displacement mechanism 17. The only other modifications of the motor required by the addition of the parking brake section 15 is the use of longer bolts 11 and a longer main drive shaft 41. Therefore, no redesign of the motor is required with the present invention, and the novel parking brake eliminates the need for any sort of add on brake disposed about the output shaft 31 which adds substantially to the overall length and expense of the motor-brake package.

As was mentioned in the background of the specification, there are various other gerotor movements well known to those skilled in the art beside that used in the motor shown in FIG. 1 in which the ring 23 is fixed and the star 27 orbits and rotates. For example, it is well known to let the star only rotate while the ring only orbits. In a motor utilizing this type of gerotor arrangement, the parking brake of the present invention could be located in such a position that the lock shaft would selectively permit or prevent the orbital movement of the ring, recognizing that preventing orbital movement of the ring would also prevent rotation of the star and its associated output shaft. It would also be within the scope of the present invention to apply the parking brake to an orbiting or an orbiting and rotating secondary shaft, other than the main drive shaft 41, if such a secondary shaft were associated with an orbiting star, or with an orbiting ring.

In addition, although the lock shaft 77 is shown and described herein as movable from the unlocked to the locked condition by rotation about its own axis, it is within the scope of the invention to provide a lock shaft which moves axially between the unlocked and locked conditions, i.e., the lock surface and cutaway portion whould be circumferentially aligned but axially separated. Although the subject embodiment is illustrated as including an actuator handle 107, the invention is adaptable to the use of either remote manual control or remote hydraulic control, whether the lock shaft rotates or moves axially.

The invention has been described in detail sufficient to enable one skilled in the art to make and use the same, and several obvious alternative embodiments have been described in general. It is believed that upon a reading and understanding of the specification, certain additional alterations and modifications will occur to those skilled in the art, and it is intended that the invention include all such alterations and modifications, insofar as they come within the scope of the appended claims.

I claim:

1. A rotary fluid pressure device of the type including housing means defining fluid inlet means and fluid outlet means; an internal gear set associated with said housing means and including an internally-toothed member and an externally-toothed member eccentrically disposed within said internally-toothed member, one of said members having rotational movement about its axis, and one of said members having orbital movement about the axis of the other member, the teeth of said members interengaging to define expanding and contracting volume chambers during said movements; valve means operable in response to one of said movements to communicate fluid from said fluid inlet means to one of said expanding and contracting fluid chambers, and from the other of said fluid chambers to said fluid outlet means; shaft means operatively associated with one of said toothed members to have one of (a) pure rotational movement, and (b) both orbital and rotational movement, characterized by:

a lock member operably associated with said housing means and being disposed adjacent one of (a) said toothed member having said orbital movement, and (b) a portion of said shaft means engaging in orbital movement, said member and said portion defining imaginary orbit circles as at least one of said member and said portion engage in said orbital movements, said lock member defining a lock surface and being movable between a first position in which said lock surface is disposed outside said orbit circles to permit normal orbital and rotational movement of said toothed members, and a second position in which said lock surface is disposed within at least one of said orbit circles to engage said one of (a) said toothed member and (b) said portion of said shaft means and prevent said orbital movement thereof, thereby preventing said rotational movement.

2. A rotary fluid pressure device as claimed in claim 1 characterized by said lock member comprising an elongated, generally cylindrical member defining an axis oriented generally transversely of the axis of said one of (a) said member or (b) said portion.

3. A rotary fluid pressure device as claimed in claim 2 characterized by said lock member being rotatable about said axis, said first position comprising a first rotational orientation of said lock member and said second position comprising a second rotational orientation of said lock member.

4. A rotary fluid pressure device as claimed in claim 1 characterized by means biasing said lock member toward said second position at least when said lock member is in said first position.

5. A rotary fluid pressure device as claimed in claim 4 characterized by actuation means operably associated with said lock member for moving said lock member between said first and second positions.

6. A rotary fluid pressure device as claimed in claim 5 characterized by lost motion connection means operably associated with said lock member and said actuation means, whereby movement of said actuation means to a position corresponding to said first position of said lock member permits movement of said lock member to said first position under the influence of said biasing means.

7. A rotary fluid pressure device of the type including housing means defining fluid inlet means and fluid outlet means; an internal gear set associated with said housing means and including an internally-toothed member fixed relative to said housing means, and an externally-toothed member eccentrically disposed within said internally-toothed member for orbital and rotational movement relative to said internally-toothed member, the teeth of said members interengaging to define expanding and contracting volume chambers during said relative movement; valve means operable in response to said relative movement to communicate fluid from said fluid inlet means to one of said expanding and contracting fluid chambers, and from the other of said fluid chambers to said fluid outlet means; input-output shaft means extending from said housing means and rotatably supported thereby; a shaft member having a first end operatively associated with said externally-toothed member and a second end operatively associated with said input-output shaft means to transmit torque therebetween, characterized by:

a lock member operably associated with said housing means and being disposed adjacent a transverse portion of said shaft member, said transverse portion being disposed intermediate said first and second ends and defining an imaginary orbit circle as said externally-toothed member orbits and rotates, said lock member defining a lock surface and being movable between a first position in which said lock surface is disposed outside said orbit circle to permit normal orbital and rotational movement of said shaft member, and a second position in which said lock surface is disposed within said orbit circle to engage said shaft member and prevent orbital movement thereof, thereby preventing rotation thereof.

8. A rotary fluid pressure device as claimed in claim 7 characterized by said lock member comprising an elongated, generally cylindrical member defining an axis of rotation oriented generally transversely of the axis of said shaft member.

9. A rotary fluid pressure device as claimed in claim 8 characterized by said first position comprising a first rotational orientation of said lock member and said second position comprising a second rotational orientation of said lock member.

10. A rotary fluid pressure device as claimed in claim 9 characterized by actuation means operably associated with said lock member for moving said lock member between said first and second rotational orientations.

11. A rotary fluid pressure device as claimed in claim 10 characterized by means biasing said lock member toward said second position at least when said lock member is in said first position.

12. A rotary fluid pressure device as claimed in claim 11 characterized by lost motion connection means operably associated with said lock member and said actuation means, whereby movement of said actuation means to a position corresponding to said first position of said lock member permits movement of said lock member to said first position under the influence of said biasing means.

13. A rotary fluid pressure device as claimed in claim 12 characterized by said biasing means comprising a torsional spring member having one end thereof fixed relative to said housing means, and the other end thereof fixed relative to said rotatable lock member.

14. A rotary fluid pressure device as claimed in claim 12 characterized by rotation limiting means operably associated with said lock member to prevent rotation of said lock member to a rotational orientation other than said first and second rotational orientation to said lock member.

* * * * *